(12) United States Patent
Bohling et al.

(10) Patent No.: US 8,217,102 B2
(45) Date of Patent: Jul. 10, 2012

(54) LOW ODOR STYRENIC POLYMER DISPERSIONS

(75) Inventors: James C. Bohling, Lansdale, PA (US); Steven S. Edwards, Horsham, PA (US); Alvin M. Maurice, Lansdale, PA (US); Tingke Zhang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/972,696

(22) Filed: Dec. 20, 2010

(65) Prior Publication Data

US 2011/0160368 A1  Jun. 30, 2011

(51) Int. Cl.
*C08K 5/00* (2006.01)
*C08K 5/10* (2006.01)
(52) U.S. Cl. .................................... 524/210; 524/315
(58) Field of Classification Search .................... 524/210
See application file for complete search history.

(56) References Cited

U.S. PATENT DOCUMENTS

| | | | |
|---|---|---|---|
| 5,145,890 A * | 9/1992 | Frederick et al. | 524/21 |
| 5,296,530 A | 3/1994 | Bors | |
| 5,380,785 A | 1/1995 | Ngoc | |
| 5,415,940 A | 5/1995 | Ngoc | |
| 5,616,651 A * | 4/1997 | Ni no et al. | 525/305 |
| 5,674,933 A * | 10/1997 | Ngoc et al. | 524/504 |
| 6,727,314 B2 | 4/2004 | Burghart | |
| 6,969,734 B1 | 11/2005 | Pressley | |
| 2006/0122330 A1 | 6/2006 | Wu | |
| 2006/0135684 A1 | 6/2006 | Killilea | |
| 2006/0135686 A1 | 6/2006 | Killilea | |
| 2009/0312469 A1* | 12/2009 | Koziski et al. | 524/147 |

FOREIGN PATENT DOCUMENTS

| | | |
|---|---|---|
| EP | 0147759 | 7/1985 |
| EP | 1553106 | 1/2004 |
| EP | 1539832 | 6/2005 |

* cited by examiner

*Primary Examiner* — Hui Chin
(74) *Attorney, Agent, or Firm* — Cantor Colburn LLP

(57) ABSTRACT

A low odor aqueous styrene containing polymer dispersions comprising low level acetoacetoxy or acetoacetamide functional group in monomer or as non-polymeric additive with high boiling point organic amine is provided. The aqueous polymer dispersion is useful for preparing low odor coatings.

13 Claims, No Drawings

LOW ODOR STYRENIC POLYMER DISPERSIONS

BACKGROUND

This patent application claims the benefit of the earlier filed Chinese Patent Application serial number 200910266832.7 filed on Dec. 30, 2009.

This invention relates a low odor aqueous styrenic polymer dispersion comprising acetoacetoxy or acetoacetamide functional polymer particles or acetoacetoxy or acetoacetamide additives and at least one organic amine having high boiling point. The aqueous polymer dispersion is useful for preparing coatings without the unpleasant odor of styrene containing dispersion.

Elimination of odorants from polymer dispersions is long-desired in polymer industry, especially for consumer products with olfaction requirements. The odorants have different chemical nature including residual monomers, impurities in monomers or in other raw materials of the polymerization process. The elimination methods include, heating the polymerization mixture for a prolonged period with or without addition of ion- or free radical-source to raise the monomer conversion ratio, vacuum stripping or steam sparging to physically remove hydrophilic odorants and using enzyme to enzymolysis ester odorants. However, these methods are time consuming and raise the cost of the manufacture processes.

In styrene containing polymer dispersions, it is difficult to remove the unpleasant odor which may be volatilized from the styrenic monomer or other compound(s) in the dispersion that have not been identified. Prolonging the polymerization period, steam stripping for several times or using enzyme can not achieve a satisfactory deodorization of the dispersion.

One effective method for deodorizing polymer dispersions is to add chemicals reacting with residual monomers and generating odorless adducts or converting to a less odorous species such as non-volatile adducts. U.S. Pat. No. 5,616,651 discloses a process to prepare a rubbery polymer, which includes a step to deodorize the polymer emulsion obtained. This deodorizing step is carried out under conditions which allow for an additional aminoalcohol to react with residual monomers n-butylacrylate and acrylonitrile which is presented in the emulsion. However, the deodorizing method is only applied to the residual n-butylacrylate and acrylonitrile. The odor from styrene and/or impurities from the styrene monomer or other raw material in polymerization is still desired to be eliminated.

EP 1,553,106 discloses a low odor polymer dispersion that containing styrene monomer. The deodorants containing aminoalcohol, hydroxylamine and hydrazine are uses to reduce the content of benzaldehyde of the dispersion. However, these deodorants are not applied to deodorizing of residual styrene and/or impurities from the styrene monomer.

U.S. Pat. No. 6,969,734 discloses an aqueous polymer dispersion containing acetoacetoxy functional polymer particles and an alkyl ethoxylated surfactants, which is useful for preparing coatings having improved adhesion to substrates. The acetoacetoxy functional groups are used for the purpose of potential crosslinking of the polymer particles. In a preferable embodiment, in order to minimize hydrolysis of the pendant acetoacetoxy groups, one or more bases are added to the aqueous polymer dispersion to raise the pH to a value in the range of from 8 to 11. Suitable bases include ammonia, or primary amines such as ethanolamine, methyl amine, or iso-propyl amine. The invention also discloses that, optionally, the aqueous polymer is treated to remove volatile organic compounds (VOCs) by processes such as steam stripping or distillation. However, the prior art reference does not disclose that the odor of some of the aqueous polymer dispersions comprising styrenic monomers can be eliminated by mixing with two or more of above mentioned compounds such as, for example, the acetoacetoxy functional polymer particles and ethanolamine, and by steam stripping. Neither appropriate amines nor amount of the amine effective for such deodorizing is disclosed.

It is, therefore, an object of this invention to provide styrenic aqueous polymer dispersions free of unpleasant odor, methods for preparing low odor polymer dispersion and low odor coating compositions prepared therefrom.

STATEMENT OF INVENTION

The first aspect of the present invention is directed to a low odor aqueous styrenic polymer dispersion, comprising, by weight percentage based on the dry weight of the polymer dispersion, (co)polymer(s) comprising, as (co)polymerized units, a styrenic monomer (a) and from 0 to 20%, an ethylenically unsaturated monomer (b) having at least one acetoacetoxy or acetoacetamide functional group; and from 0 to 20%, a non-polymeric compound (c) having at least one acetoacetoxy or acetoacetamide functional group; and from 0.01 to 5%, an amine derivative;

wherein the boiling point temperature of the amine derivative is at least 150° C.

wherein the total amount of the monomer (b) and the compound (c) ranges from 0.01 to 20%.

The second aspect of the present invention is to provide a method for preparing a low odor aqueous styrenic polymer dispersion, comprising the steps of:

1) providing a polymer dispersion comprising, by weight percentage based on the dry weight of the polymer dispersion, (co)polymer(s) comprising, as (co)polymerized units, a styrenic monomer (a) and from 0 to 20%, an ethylenically unsaturated monomer (b) having at least one acetoacetoxy or acetoacetamide functional group; and from 0 to 20%, a non-polymeric compound (c) having at least one acetoacetoxy or acetoacetamide functional group; and from 0.01 to 5%, an amine derivative;

wherein the boiling point temperature of the amine derivative is at least 150° C.;

wherein the total amount of the monomer (b) and the compound (c) ranges from 0.01 to 20%;

2) steam stripping or carboxylesterase enzyme treating the polymer dispersion of step 1).

The third aspect of the present invention is to provide a coating composition comprising a low odor aqueous styrenic polymer dispersion prepared by the method of the second aspect of the present invention.

DETAILED DESCRIPTION

For the purpose of describing the components in the compositions of this invention, all phrases comprising parenthesis denote either or both of the included parenthetical matter and its absence. For example, the phrase "(co)polymer" includes, in the alternative, polymer, copolymer and mixtures thereof; the phrase "(meth)acrylate" means acrylate, methacrylate, and mixtures thereof, and the phrase "(meth)acrylic" used herein means acrylic, methacrylic, and mixtures thereof.

As used herein, the term "aqueous polymer dispersion" refers to a composition containing discrete polymer particles dispersed in an aqueous medium, for example, aqueous polymer emulsion.

As used herein, the term "styrenic polymer" refers to a monomer containing a molecular structure of, or a polymer containing a polymerized unit of styrene or any of its derivatives such as, for example, styrene, methyl styrene, vinyl toluene, methoxy styrene, butyl styrene, or chlorostyrene, or the like.

As used herein, the term "pendant" means "attached to the polymer backbone as a side group, but not within the polymer backbone". The term "pendant" also includes attachment of such a group at the termini of a polymer chain.

As used herein, the term "up to" in a range means any and all amounts greater than zero and through to and including the end point of the range.

As used herein, unless otherwise indicated, the unit "wt %" shall mean a dry weight percentage based on total dry weight of polymerized monomers.

"Glass transition temperature" or "Tg" used herein are those calculated by using the Fox equation (T. G. Fox, Bull. Am. Physics Soc., Volume 1, Issue No. 3, page 123 (1956)). That is, for calculating the Tg of a copolymer of monomers M1 and M2, $$\frac{1}{T_g(calc.)} = \frac{w(M_1)}{T_g(M_1)} + \frac{w(M_2)}{T_g(M_2)}$$

wherein Tg (calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, all temperatures being in K. The glass transition temperatures of homopolymers may be found, for example, in "Polymer Handbook", edited by J. Brandrup and E. H. Immergut, Interscience Publishers.

The aqueous polymer dispersion of the present invention comprises (co)polymer(s) comprising, as (co)polymerized units, a styrenic monomer (a). The styrenic monomer herein is a monomer having unpleasant odor in olfaction and having a molecular structure of styrene or any of its derivatives such as, for example, styrene, methyl styrene, vinyl toluene, methoxy styrene, butyl styrene, or chlorostyrene, or the like.

In one embodiment of the present invention, the level of the styrenic monomer (a) ranges from 2 to 80%, preferably from 5 to 70 wt %, more preferably from 10 to 70 wt %, and the most preferably from 20 to 60 wt %, by dry weight percentage based on the total dry weight of the polymer dispersion.

In one embodiment of the present invention, the aqueous polymer dispersion comprises (co)polymer(s) comprising, as (co)polymerized units, a monomer (b) having at least one acetoacetoxy or acetoacetamide functional group. The level of the monomer (b) ranges from 0 to 20%, preferably 0.1 to 10%, more preferably 0.1 to 1%, by dry weight percentage based on the total dry weight of the polymer dispersion.

It is contemplated that the monomer (a) and the monomer (b) of the present invention are copolymerized in one copolymer of the aqueous polymer dispersion. By "one copolymer" herein includes a discrete copolymer molecule with or without grafted, blocky, star-like or net-like structure. It is also contemplated that the monomer (a) and the monomer (b) are not copolymerized in one copolymer chain such as, for example, in two discrete (co)polymer chains; in two crosslinked (co)polymer particles; in core/shell (co)polymer particles in which one (co)polymer phase is fully or partially encapsulated by a different (co)polymer phase; in (co)polymer particles having multiple (co)polymer microdomains within a continuous (co)polymer phase; in multilobe (co) polymer particles; or in interpenetrating network polymers.

The aqueous polymer dispersion comprises, as an additive mixed with above mentioned (co)polymer(s) in the dispersion, from 0 to 20%, preferably from 0.1 to 10%, more preferably from 0.1 to 5%, by weight percentage based on the total dry weight of the polymer dispersion, a non-polymeric compound (c) having at least one acetoacetoxy or acetoacetamide functional group. The acetoacetoxy or acetoacetamide functional polymers can be regarded and used as additives that be added into the styrenic polymer aqueous dispersions when the monomer (a) and monomer (b) are not copolymerized in one polymer chain. Using such acetoacetoxy or acetoacetamide functional polymers as additives achieves similar deodorization results as compared to non-copolymerized compounds (c) as additives in the styrene containing aqueous polymer dispersions.

The acetoacetoxy or acetoacetamide groups are represented by

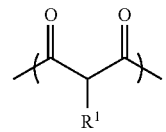

wherein $R^1$ is hydrogen, or alkyl having 1 to 10 carbon atoms, or phenyl. Examples of acetoacetoxy or acetoacetamide functional groups are

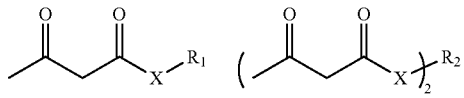

Wherein X is O or N, $R_1$ is a divalent radical and $R_2$ is a trivalent radical, that attach the acetoacetoxy or acetoacetamide functional group to the polymer backbone or as dispersed in aqueous medium. Suitable levels of acetoacetoxy or acetoacetamide functional groups may be in the range of from $1 \times 10^{-6}$ to $8 \times 10^{-4}$ mole of acetoacetoxy or acetoacetamide functional groups per gram of styrene containing acetoacetoxy or acetoacetamide functional polymer particles or styrene containing polymer particles.

The styrene containing acetoacetoxy or acetoacetamide functional polymer particles can be prepared by polymerization of acetoacetoxy or acetoacetamide functional monomer, nonionic monomer, and optionally, ionic monomer.

Acetoacetoxy or acetoacetamide functional monomers are monomers having an ethylenic unsaturation and one or more acetoacetyl moieties. These acetoacetyl functional monomers have the following structures:

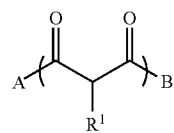

wherein A is either:

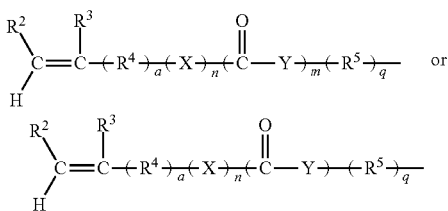

wherein $R^1$ is selected from H, alkyl having 1 to 10 carbon atoms, and phenyl; $R^2$ is selected from H, alkyl having 1 to 10 carbon atoms, phenyl, halo, $CO_2CH_3$, and CN; wherein $R^3$ is selected from H, alkyl having 1 to 10 carbon atoms, phenyl, and halo; wherein $R^4$ is selected from alkylene having 1 to 10 carbon atoms and phenylene; wherein $R^5$ is selected from alkylene having 1 to 10 carbon atoms and phenylene; wherein a, m, n, and q are independently selected from 0 and 1; wherein each of X and Y is selected from —NH— and —O—; and B is selected from A, alkyl having 1 to 10 carbon atoms, phenyl, and heterocyclic groups. Examples of the acetoacetoxy functional monomers include, among the following, acetoacetoxyalkyl(meth)acrylates such as acetoacetoxyethyl (meth)acrylate, acetoacetoxypropyl(meth)acrylate, acetoacetoxybutyl (meth)acrylate, and 2,3-di(acetoacetoxy)propyl(meth)acrylate; allyl acetoacetate; vinyl acetoacetate; various acetoacetamides, including, but not limited to:

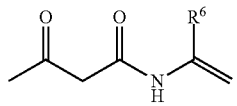

wherein $R^6$ is either H or methyl; and combinations thereof. Preferred acetoacetoxy functional monomers include acetoacetoxyethyl(meth)acrylate, acetoacetoxypropyl(meth)acrylate, allyl acetoacetate, acetoacetoxybutyl (meth)acrylate, 2,3-di(acetoacetoxy)propyl(meth)acrylate, and combinations thereof.

Suitable total amount of the monomer (b) and the compound (c) is from 0.01 to 20%, preferably from 0.1 to 10%, more preferably from 0.1 to 5%, by weight percentage based on the total dry weight of the polymer dispersion. In a preferable embodiment, the polymer dispersion contains acetoacetoxy or acetoacetamide functional (co)polymer(s) containing, as polymerized units, from 0.1 to 5%, preferably 0.1 to 1%, one or more acetoacetoxy or acetoacetamide functional monomers in the category monomer (b).

In one embodiment of the present invention, the acetoacetoxy or acetoacetamide functional (co)polymer(s) comprises non-styrenic nonionic polymerized monomers. A "nonionic monomer" herein is a monomer that contains at least one ethylenic unsaturated but does not have a pendant acid or base group. Further, said nonionic monomer expressly excludes the styrenic monomer (a) and acetoacetoxy or acetoacetamide functional monomer (b). Examples of the nonionic monomers include: butadiene; vinyl naphthalene; ethylene; propylene; vinyl acetate; vinyl versatate; vinyl chloride; vinylidene chloride; acrylonitrile; various $C_1$-$C_{40}$ alkyl esters of (meth)acrylic acid, such as methyl(meth)acrylate, ethyl(meth)acrylate, n-butyl(meth)acrylate, 2-ethylhexyl(meth)acrylate, cyclohexyl(meth)acrylate, n-octyl (meth)acrylate, n-decyl (meth)acrylate, n-dodecyl(meth)acrylate, tetradecyl(meth)acrylate, lauryl (meth)acrylate, oleyl(meth)acrylate, palmityl(meth)acrylate, and stearyl (meth)acrylate; other (meth)acrylates such as isobornyl (meth)acrylate, benzyl (meth)acrylate, phenyl(meth)acrylate, and 2-bromoethyl(meth)acrylate; alkoxyalkyl(meth)acrylates, such as ethoxyethyl(meth)acrylate; full esters of ethylenically unsaturated di- and tricarboxylic acids and anhydrides, such as diethyl maleate, dimethyl fumarate, and ethyl methyl itaconate. Other suitable nonionic monomers include multiethylenically unsaturated monomers, which are effective for increasing the molecular weight of the polymer particles. Examples of the multiethylenically unsaturated monomers include tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, allyl (meth)acrylate, divinylbenzene, divinyltoluene, trivinylbenzene, and divinyl naphthalene. Suitable levels of copolymerized nonionic monomer in the copolymer ranges from 20 to 94 wt %, preferably from 40 to 80 wt %, and more preferably from 40 to 70 wt %, based on the total weight of the polymer dispersion.

The acetoacetoxy or acetoacetamide functional (co)polymer optionally includes, as copolymerized units, at least one ionic monomer. The copolymerized ionic monomer may be included in the acetoacetoxy or acetoacetamide functional polymer particles to help stabilize the polymer particles in the aqueous medium. As used herein, "ionic monomer" expressly excludes acetoacetoxy or acetoacetamide functional monomers, styrenic monomers and nonionic monomers. The ionic monomer may be an anionic monomer or alternatively, a cationic monomer. As used herein, "anionic monomer" refers to an ionic monomer that contains at least one pendant acid group or salt thereof. Examples of the anionic monomer include carboxylic acid containing monomers such as (meth)acrylic acid, itaconic acid, fumaric acid, and maleic acid; anhydrides, which can form carboxylic acid monomers in the presence of water, such as itaconic anhydride and maleic anhydride; and partial esters of multicarboxylic acid monomers, such as ethyl maleate. Other examples of acid containing monomers are phosphorus acid monomers such as 2-phosphoethyl(meth)acrylate; and sulfur acid monomers such as sodium vinyl sulphonate, 2-acrylamido-2-methylpropane sulfonic acid, vinyl sulphonic acid, sulfoethyl(meth)acrylate, and methacryloxyisopropyl acid sulfophthalate, and hydroxy, dihydroxy, amino or diamino alkyl or aryl sulfonic acids, such as, 1,4-butanediol 2-sulfonic acid. As used herein, "cationic monomer" refers to an ionic monomer that contains at least one pendant base group or salt thereof. The cationic monomer expressly excludes acetoacetoxy or acetoacetamide functional monomer (b). Examples of the cationic monomer include amine functional monomers such as, for example, 2-vinoxyethylamine, 2-vinoxyethylethylene-diamine, 3-aminopropyl vinyl ether, 2-amino-2-methylpropyl vinyl ether, and 2-aminobutyl vinyl ether; and amide containing monomers such as (meth) acrylamide, dimethylaminoethyl (meth) acrylate, and oxazolidinoethyl(meth)acrylate. In certain non-limiting embodiments, the acetoacetoxy or acetoacetamide, functional polymer particle contains as polymerized units both anionic monomer and cationic monomer. Suitable levels of the polymerized ionic monomer in the acetoacetoxy or acetoacetamide functional copolymer range up to 40 wt %, preferably from 0.1 to 10 wt %, and more preferably, from 0.1 to 5 wt %, based on the total weight of the polymer dispersion. The acetoacetoxy or acetoacetamide functional copolymer may contain one or more polymerized ionic monomers.

The types and levels of the acetoacetoxy or acetoacetamide functional monomer, the nonionic monomer, and the optional ionic monomer may be chosen to provide the acetoacetoxy or acetoacetamide functional (co)polymer with a glass transition temperature suitable for an intended end use. Suitable ranges for the glass transition temperature of the acetoacetoxy or acetoacetamide functional (co)polymer include the range of from −60° C. to 100° C., preferably the range of from −40° C. to 80° C. and more preferably the range of from −40° C. to 60° C.

Typically, the acetoacetoxy or acetoacetamide functional (co)polymer particles have an average diameter in the range of from 25 nanometers (nm) to 20 micron, preferably from 25 nm to 10 micron, and more preferably from 25 nm to 5 micron. The average polymer particle diameter may be determined by a quasi-elastic light scattering technique, using an instrument such as a BROOKHAVEN™ Model BI-90 Particle Sizer, supplied by Brookhaven Instruments Corporation, Holtsville, N.Y.

The acetoacetoxy or acetoacetamide functional (co)polymer of the present invention may be prepared by well known polymerization techniques, such as suspension polymerization or emulsion polymerization of ethylenically unsaturated monomers. Emulsion polymerization is preferred. Suitable processes are disclosed in U.S. Pat. No. 5,356,968 and U.S. Pat. No. 5,264,530. An alternate process to prepare the acetoacetoxy or acetoacetamide functional polymer particles is solution polymerization followed by the conversion of the solution polymer to the acetoacetoxy or acetoacetamide functional polymer particles by various methods known in the art. Suitable polymer processes, which include emulsion polymerization, solution polymerization, and suspension polymerization process, may be conducted as batch, semicontinuous, or continuous processes. Aqueous emulsion polymerization is a preferred process for preparing the acetoacetoxy functional polymer particles. Temperatures suitable for aqueous emulsion polymerization processes are in the range of from 20° C. to less than 100° C., preferably in the range of from 20° C. to 90° C. The polymerization processes commonly employ various synthesis adjuvants such as thermal or redox polymerization initiators, chain transfer agents, catalysts, surfactants, high molecular weight polymers, dispersants, salts, buffers, acids, or bases. Preferably the use of organic solvents is minimized in the polymerization process to provide an aqueous polymer dispersion with low levels of volatile organic compounds (VOCs). The aqueous polymer dispersion containing the acetoacetoxy or acetoacetamide functional polymer particles is optionally treated to remove VOCs by processes such as steam stripping or distillation.

The aqueous polymer dispersion of this invention also contains an aqueous medium in which the acetoacetoxy or acetoacetamide functional polymer particles are dispersed. The aqueous medium optionally contains cosolvents including water miscible cosolvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, Coasol, Dalpad, butanol, and mineral spirits, preferably Coasol or Dalpad, as cosolvents. The aqueous polymer dispersion may be provided with 10 to 70 wt % polymer particles, based on the dry weight of the polymer dispersion. Preferably, one or more bases are added to the aqueous polymer dispersion to raise the pH to a value in the range of from 7 to 11, and more preferably in the range of from 7 to 9.5.

The compound (c) containing acetoacetoxy or acetoacetamide functional groups is used as additive and can be post added to the aqueous polymer dispersion or added in process of polymerization. The compound (c) can be small molecule compounds, whose molecule weight ranges from 116 to 800 g/mole.

For remove the unpleasant odor of the styrenic polymer dispersion, suitable organic amines should be selected and mixed with acetoacetoxy or acetoacetamide groups in the dispersion. The suitable amines should have a boiling point temperature of more than 150° C., preferably more than 170° C. Examples of the suitable amines include primary amines, secondary amines and tertiary amines; and, from another aspect, amine derivatives such as, for example, alkylamine, arylamine, alcoholamine, polyamine and amino acid. Preferably, the amine is soluble in aqueous phase and has boiling point more than 150° C., which including, but not limited to mono-ethanolamine, diethanolamine, triethanolamine, N-(2-aminoethyl)ethanolamine, N,N,N',N'-tetra(2-hydroxyethyl) ethylenediamine, diethylene triamine, triethylene tetramine, tetraethylenepentamine, and glycine. Some primary amines having low boiling point and/or low threshold are not suitable amines and thus excluded from the amines of the present invention. Preferably, the dispersion is free of ammonia. By "free of ammonia" here is meant substantially free from ammonia, containing trace concentration of ammonia as an impurity, or below a detectable minimum concentration of ammonia in the polymer dispersion. Suitable levels of amine in the aqueous polymer dispersion include from 0.01 to 5 wt %, preferably from 0.01 to 2 wt %, and more preferably, from 0.1 to 1 wt %, based on the total dry weight of the aqueous polymer dispersion.

In addition, the aqueous polymer dispersion optionally includes other components, including other polymers, surfactants, pigments such as titanium dioxide, extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants. The aqueous polymer dispersion may contain coalescent in the amount of from 0 to 40 wt %, preferably 0 to 20 wt %, and more preferably 0 to 5 wt %, based on the dry weight of the (co)polymer. Preferably, the aqueous polymer dispersion is absent of coalescent.

The aqueous polymer dispersion may contain acetoacetoxy or acetoacetamide functional polymer particles having a multimodal particle diameter distribution, such as a bimodal distribution. In one non-limiting embodiment, the aqueous polymer dispersion contains a small mode of acetoacetoxy or acetoacetamide functional polymer particles and a large mode of acetoacetoxy or acetoacetamide functional polymer particles, wherein the small mode has an average particle diameter in the range of from 25 to 150 nm, and the large mode has an average particle diameter of less than 1000 nm but larger than the average particle diameter of the small mode. Further, in this non-limiting embodiment, the ratio of the small mode acetoacetoxy or acetoacetamide functional polymer particles to the large mode acetoacetoxy or acetoacetamide functional polymer particles may be in the range of from 1:90 to 9:1 by weight.

The aqueous styrenic polymer dispersion of the present invention is prepared by copolymerizing of the styrenic monomer (a) with the acetoacetoxy or acetoacetamide functional monomer (b) or mixing the styrenic (co)polymer with the non-polymeric acetoacetoxy or acetoacetamide functional compound (c); and essentially, mixed with the amine derivative having a boiling point of at least 150° C. in or post the polymerization process. Above obtained low odor styrenic polymer dispersion may be subjected to further deodorization processes including both or either of steam stripping and carboxylesterase enzyme treatment. The steam stripping can be proceeded for one to several cycles or passes to eliminate slight odor left in the dispersion. The carboxylesterase can be added to the aqueous dispersion at room temperature, then stay overnight or follow enzyme supplier's instruction to remove odorant substrate such as butyl acetate and butyl propionate from the dispersion.

As one of the applications of the low odor aqueous polymer dispersions, a low odor coating composition is achievable by the present invention by using the polymer dispersion as a binder.

The low odor coating composition is suitable for various styrene containing coating systems including, such as acrylic coatings, vinyl acrylic coatings, styrene acrylic coatings, powder coatings, solvent acrylic coatings, alkyd resin coatings, solvent urethane coatings, and epoxy coatings.

The low odor coating composition is suitable for application onto various substrates including bare or pre-painted substrates such as, but not limited to, cement, ceramic, tile, painting, glass, plastic, wood, metal, woven and non-woven textile, and paper; extremely suitable for consumer products with olfaction requirements, which containing or covered by above mentioned substrates.

In the present specification, the technical features in each preferred technical solution and more preferred technical solution can be combined with each other to form new technical solutions unless indicated otherwise. For briefness, the applicant omits the descriptions for these combinations. However, all the technical solutions obtained by combing these technical features should be deemed as being literally described in the present specification in an explicit manner.

The following examples are presented to illustrate the process and the composition of the invention. These examples are intended to aid those skilled in the art in understanding the present invention. The present invention is, however, in no way limited thereby.

EXAMPLES

The following materials were used in the examples:

| Abbreviation | Chemical Nature |
|---|---|
| N51032 | Enzyme NOVOZYM ™ 51032, 5% solution [Novozymes, Bagsvaerd, Denmark] |
| BA | Butyl Acrylate |
| ST | Styrene |
| (M)AA | (Meth)acrylic Acid |
| AAEM | Acetoacetoxyethyl methacrylate |
| SSS | Sodium p-styrenesulfonate |
| MEA | Mono-ethanolamine |
| t-BHP | tert-butyl hydroperoxide |
| EDTA | tetrasodium salt of ethylenediaminetetraacetic acid |
| AASP | Acetoacetanilide-4-sulfonic acid potassium |

The following processes were used in the examples:
The steam stripping process was: Put the sample into oven and preheated to 50° C. Then the sample is stripped with one or two passes through a single stage, continuous stripper. The relative flow rate of steam to dispersion during stripping was 1:5.

Odor evaluation according to olfaction sensation was performed as: 10 people selected for smell the in can odor of different aqueous dispersions, then gave the rate, the rates were given in tables based on the average evaluation. The results were ranked on a scale of 1 to 5 as described below.

| Rank | Pleasant Odor | Unpleasant Odor* |
|---|---|---|
| 5 | no pleasant odor | no unpleasant odor |
| 4 | slight pleasant odor | slight unpleasant odor |
| 3 | moderate pleasant | moderate unpleasant |
| 2 | strong pleasant | strong unpleasant odor |
| 1 | severe pleasant | severe unpleasant odor |

*unpleasant odor including odor from styrene and form BA

Sense of Olfaction:
Excellent=no odor
Very Good=slight pleasant odor, no unpleasant odor
Good=slight or moderate pleasant odor, no unpleasant odor from ST, slight unpleasant odor from BA
Fair=moderate pleasant odor, slight unpleasant odor from ST, moderate unpleasant odor from BA
Poor=moderate pleasant odor, moderate unpleasant odor from ST, moderate unpleasant odor from BA
Very Poor=moderate pleasant odor, strong or severe unpleasant odor from ST, moderate unpleasant odor from BA.

The aqueous dispersions were prepared in a 5-liter, four necked round bottom flask equipped with a paddle stirrer, a thermometer, a nitrogen inlet, and a reflux condenser.

Example 1

Control of Styrene Acrylic Aqueous Polymer Dispersions

An aqueous dispersion A was prepared as following process: A mixture of 32.35 g of sodium dodecyl benzene sulfonate (18 wt % solution), and 660 g of deionized water was added to the flask and heated to 89° C. under a nitrogen atmosphere. A monomer emulsion (ME) was prepared by mixing 406 g of deionized water, 71.9 g of sodium dodecyl benzene sulfonate (18% solution), 922 g BA, 652 g styrene, 24.3 g MAA, and 4.8 g Sodium p-Vinyl phenylsulfonate. With the contents of the flask at 88° C., the following materials were added in order: a solution of 7.2 g of sodium carbonate in 26 g of deionized water, a mixture of 58 g of monomer emulsion and 33 g of deionized water, and a mixture of 18.2 g of a solution of 0.1 wt % iron sulfate in water, and 2.7 g of a solution of 1 wt % tetrasodium salt of ethylenediaminetetraacetic acid in water, and a solution of 5.09 g sodium persulfate in 16.5 g deionized water. The ME was then added to the flask over a period of less than 3 hours while maintaining the contents of the flask at a temperature of 88° C. A solution of 2.9 g of sodium persulfate in 90 g of deionized water and a solution of sodium bisulfite 2.5 g in 90 g of deionized water were coadded along with the monomer emulsion addition over the same length of time. After the complete addition of the ME, the ME container was rinsed with 22 g of deionized water. After 20 minutes, a solution of 3.8 g of 70% tBHP in 30 g of deionized water and a solution of 2.3 g of isoascorbic acid in 30 g of deionized water were added over a period of less than 40 minutes and the contents of the flask was allowed to cool to 45° C. Next, a solution of 100 g of 5% sodium hydroxide was added and the contents of the flask were filtered to remove any coagulum. The resulting aqueous polymer dispersion control A had a pH of 8.0 and 50.2 wt % solids.

Example 2

Use AAEM in Styrene Acrylic Aqueous Polymer Dispersions

An aqueous dispersion B was prepared as following process: A mixture of 32.35 g of sodium dodecyl benzene sulfonate (18% solution), and 660 g of deionized water was added to the flask and heated to 89° C. under a nitrogen atmosphere. A monomer emulsion was prepared by mixing 406 g of deionized water, 71.9 g of sodium dodecyl benzene sulfonate (18% solution), 915 g BA, 645 g styrene, 24.3 g MAA, and 4.8 g Sodium p-Vinyl phenylsulfonate. With the contents of the flask at 88° C., the following materials were added in order: a solution of 7.2 g of sodium carbonate in 26 g of deionized water, a mixture of 58 g of monomer emulsion and 33 g of deionized water, and a mixture of 18.2 g of a solution of 0.1 wt % iron sulfate in water, and 2.7 g of a solution of 1 wt % tetrasodium salt of ethylenediaminetetraacetic acid in water, and a solution of 5.09 g sodium persulfate in 16.5 g deionized water. The ME was then added to the flask over a period of less than 3 hours while maintaining the contents of the flask at a temperature of 88° C. A solution of 2.9 g of sodium persulfate in 90 g of deionized water and a solution of sodium bisulfite 2.5 g in 90 g of deionized water were coadded along with the monomer emulsion addition over the same length of time. When 50 wt % of the ME was added, 16.8 g AAEM was added to the ME container. After the complete addition of the ME, the ME container was rinsed with 22 g of deionized water. After 20 minutes, a solution of 3.8 g of 70% LBHP in 30 g of deionized water and a solution of 2.3 g of isoascorbic acid in 30 g of deionized water were added over a period of less than 40 minutes and the contents of the flask was allowed to cool to 45° C. Next, a solution of 100 g of 5% sodium hydroxide was added and the contents of the flask were filtered to remove any coagulum. The resulting aqueous polymer dispersion B had a pH of 8.0 and 49.8 wt % solids.

Example 3

Use MEA in Styrene Acrylic Aqueous Polymer Dispersions

In a similar procedure to aqueous polymer dispersion A (Example 1), an aqueous polymer dispersion C was prepared from a monomer mixture that contained 922 g BA, 652 g styrene, 24.3 g MAA, and 4.8 g Sodium p-Vinyl phenylsulfonate. The neutralizer is a solution of 36 g of 5% sodium hydroxide and 18.2 g of 50% MEA aqueous solution. The resulting aqueous polymer dispersion C had a pH of 8.4 and 49.5 wt % solids.

Example 4

AAEM and MEA in Styrene Acrylic Polymer And Aqueous Polymer Dispersions

In a similar procedure to aqueous polymer dispersion B (Example 2), an aqueous polymer dispersion D was prepared from a monomer mixture that contained 915 g BA, 645 g styrene, 24.3 g MAA, and 4.8 g Sodium p-Vinyl phenylsulfonate, 16.8 g AAEM. The neutralizer is a solution of 36 g of 5% sodium hydroxide and 18.2 g of 50% MEA (boiling point, 170° C.) aqueous solution. The resulting aqueous polymer dispersion D had a pH of 8.5 and 49.6 wt % solids.

In a similar procedure to aqueous polymer dispersion B (Example 2), an aqueous polymer dispersion E was prepared from a monomer mixture that contained 918 g BA, 648 g styrene, 24.3 g MAA, and 4.8 g Sodium p-Vinyl phenylsulfonate, 8.3 g AAEM. The neutralizer is a solution of 50 g of 5% sodium hydroxide and 3.4 g of 50% ethanolamine. The resulting aqueous polymer dispersion E had a pH of 8.7 and 49.3 wt % solids.

The resulting samples by applying AAEM and MEA were then subjected to odor evaluation and the results as shown in Table 1.

TABLE 1

Odor Evaluation of Samples A, B, C, D and E

| Samples | Pleasant Odor | Unpleasant Odor From BA | Unpleasant Odor From ST | Sense of Olfaction |
|---|---|---|---|---|
| A | 3 | 3 | 1 | Very poor |
| B | 3 | 3 | 2 | Poor |
| C | 3 | 3 | 3 | Poor |
| D | 3 | 3 | 5[a] | Good |
| E | 3 | 3 | 5[a] | Good |

[a] not detected unpleasant odor from Styrene

Above results indicated that applying the combination of AAEM and MEA could eliminated the unpleasant odor from styrene monomer.

Example 5

Combine with Steam Stripping (54° C. Under Reduce Pressure) or N51032 Enzyme Treatment Sample F: one pass steam stripping of A
Sample G: two passes steam stripping of A
Sample H: one pass steam stripping of D
Sample I: two passes steam stripping of D
Sample J: Add 0.01 wt % N51032 (based on the dry weight of aqueous polymer dispersion D) in Sample D at room temperature and then stayed overnight.

TABLE 2

Odor evaluation after additional steam stripping or enzyme treatment

| Samples | Pleasant Odor | Unpleasant Odor From BA | Unpleasant Odor From ST | Sense of Olfaction |
|---|---|---|---|---|
| F | 4 | 4 | 2 | poor |
| G | 4 | 4 | 3 | Poor |
| H | 4 | 4 | 5 | Very good |
| I | 4 | 4 | 5 | Very Good |
| J | 4 | 4 | 5 | Very Good |

The odor of the aqueous polymer dispersions was further reduced by combining of steam stripped or enzyme treatment.

Example 6

Additive and Amines Used in Styrene Acrylic Aqueous Polymer Dispersions

Sample K: At room temperature, added 2 g 50% AASP solution and 0.4 g glycine in 98 g aqueous polymer dispersion A. Then stirred for 1 hour.

Sample M: In a similar procedure to aqueous polymer dispersion B (Example 2), an aqueous polymer dispersion was prepared from a monomer mixture that contained 918 g BA, 648 g styrene, 24.3 g MAA, and 4.8 g Sodium p-Vinyl phenylsulfonate, 8.3 g AAEM. The neutralizer is a solution of 36 g of 5% sodium hydroxide. The resulting aqueous polymer dispersion L had a pH of 6.7 and 49.9 wt % solids. Then took out 110 g the aqueous polymer dispersion L and added 0.3 g butylamine (boiling point, 77° C.) at room temperature, stirred for 1 hour, and stay overnight to obtain the sample M.

Sample N: With the same procedure, used 0.4 g hexylamine (boiling point, 133° C.) in 110 g aqueous polymer dispersion L.

Sample O: With the same procedure, used 1.2 g 30% diethanolamine (boiling point, 271° C.) aqueous solution in 110 g aqueous polymer dispersion L.

Sample P: With the same procedure, used 1.3 g 30% triethanolamine (boiling point, 360° C.) aqueous solution in 110 g aqueous polymer dispersion L.

Sample Q: With the same procedure, used 1.4 g 30% triethylenetetramine (boiling point, 272° C.) aqueous solution in 110 g aqueous polymer dispersion L.

Sample R: In a similar procedure to aqueous polymer dispersion B (Example 2), an aqueous polymer dispersion was prepared from a monomer mixture that contained 918 g BA, 648 g styrene, 24.3 g MAA, and 4.8 g Sodium p-Vinyl phenylsulfonate, 8.3 g AAEM. The neutralizer is a solution of 18.2 g of 25% ammonia. The resulting aqueous polymer dispersion R had a pH of 8.2 and 50.4 wt % solids.

TABLE 3

Odor Evaluation of Samples K, M, N, O, P, Q and R

| Samples | Pleasant Odor | Unpleasant Odor | | | Sense of Olfaction |
| --- | --- | --- | --- | --- | --- |
| | | From BA | From ST | Others[b] | |
| K | 3 | 3 | 5 | | Good |
| M | 3 | 3 | 4 | Yes | Very poor |
| N | 3 | 3 | 5 | Yes | Poor |
| O | 3 | 3 | 5 | | Good |
| P | 3 | 3 | 5 | | Good |
| Q | 3 | 3 | 5 | | Good |
| R | 3 | 3 | 4 | Yes | Poor |

[b]Detected strong ammonia odor or 'fish' odor

The aqueous polymer dispersions obtained from samples using of ammonia or low boiling point (lower than 150° C.) amines had strong unpleasant odor of amine and did not reach an excellent level of styrenic odor elimination. The low odor aqueous polymer dispersions were achieved by using high boiling point water soluble amines combined with AAEM.

We claim:

1. A low odor aqueous styrenic polymer dispersion, comprising, based on the dry weight of the polymer dispersion,
(co)polymer(s) comprising, as (co)polymerized units, a styrenic monomer (a) and from 0 to 20 wt % of an ethylenically unsaturated monomer (b) having at least one acetoacetoxy or acetoacetamide functional group;
from 0 to 20 wt % of a non-polymeric compound (c) having at least one acetoacetoxy or acetoacetamide functional group; and
from 0.01 to 5 wt %, an amine derivative; wherein the boiling point temperature of the amine derivative is at least 150° C.;
wherein the total amount of the monomer (b) and the compound (c) ranges from 0.01 to 20 wt %.

2. A low odor aqueous styrenic polymer dispersion, comprising, based on the dry weight of the polymer dispersion, (co)polymer(s) comprising, as (co)polymerized units, a styrenic monomer (a) and from 0 to 20 wt % of an ethylenically unsaturated monomer (b) having at least one acetoacetoxy or acetoacetamide functional group;
from 0 to 20 wt % of a non-polymeric compound (c) having at least one acetoacetoxy or acetoacetamide functional group; and
from 0.01 to 5 wt %, an amine derivative; wherein the boiling point temperature of the amine derivative is at least 150° C.;
wherein the total amount of the monomer (b) and the compound (c) ranges from 0.01 to 20 wt %; and
wherein the monomer (a) and the monomer (b) are not copolymerized in one copolymer.

3. The polymer dispersion of claim 1, wherein the amount of the monomer (a) ranges from 10 to 70 wt % and the amount of the monomer (b) ranges from 0.1 to 10 wt %, based on the dry weight of the polymer dispersion.

4. The polymer dispersion of claim 3, wherein the amount of the monomer (a) ranges from 20 to 60 wt % and the amount of the monomer (b) ranges from 0.1 to 1 wt %, based on the dry weight of the polymer dispersion.

5. The polymer dispersion of claim 1, wherein the amine derivative is selected from primary amine, secondary amine, tertiary amine, and mixtures thereof.

6. The polymer dispersion of claim 1, wherein the amine derivative is water soluble.

7. The polymer dispersion of claim 1, wherein the amount of the amine derivative ranges from 0.1 to 1 wt %, based on the dry weight of the polymer dispersion.

8. The polymer dispersion of claim 1, wherein the polymer dispersion further comprises a carboxylesterase enzyme.

9. A method for preparing a low odor aqueous styrenic polymer dispersion, comprising the steps of:
1) providing a polymer dispersion comprising, based on the dry weight of the polymer dispersion,
(co)polymer(s) comprising, as (co)polymerized units, a styrenic monomer (a) and from 0 to 20 wt % of an ethylenically unsaturated monomer (b) having at least one acetoacetoxy or acetoacetamide functional group;
from 0 to 20 wt % of a non-polymeric compound (c) having at least one acetoacetoxy or acetoacetamide functional group; and
from 0.01 to 5 wt % of an amine derivative;
wherein the boiling point temperature of the amine derivative is at least 150° C.;
wherein the total amount of the monomer (b) and the compound (c) ranges from 0.01 to 20 wt %;
2) steam stripping or carboxylesterase enzyme treating the polymer dispersion of step 1).

10. A coating composition comprising a low odor aqueous styrenic polymer dispersion prepared by the method of claim 9.

11. The polymer dispersion of claim 1, wherein the amine derivative is selected from diethanolamine, triethanolamine, N-(2-aminoethyl)ethanolamine, N,N,N',N'-tetra(2-hydroxyethyl)ethylenediamine, diethylene triamine, triethylene tetramine, tetraethylenepentamine, and glycine.

12. The polymer dispersion of claim 1, wherein the ethylenically unsaturated monomer (b) is acetoacetoxyethyl methacrylate and the amine derivative is monoethanolamine.

13. The polymer dispersion of claim 1, wherein the dispersion is free of ammonia.

* * * * *